US008558673B2

(12) United States Patent
Moshfeghi

(10) Patent No.: US 8,558,673 B2
(45) Date of Patent: *Oct. 15, 2013

(54) SYSTEMS AND METHODS FOR PROVIDING QUALITY OF SERVICE TO RFID

(75) Inventor: Mehran Moshfeghi, Rancho Palos Verdes, CA (US)

(73) Assignee: Golba LLC, Rancho Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/615,556

(22) Filed: Sep. 13, 2012

(65) Prior Publication Data

US 2013/0015957 A1    Jan. 17, 2013

Related U.S. Application Data

(63) Continuation of application No. 13/180,371, filed on Jul. 11, 2011, now Pat. No. 8,284,031, which is a continuation of application No. 11/809,013, filed on May 30, 2007, now Pat. No. 7,978,050.

(51) Int. Cl.
    *G08B 13/14* (2006.01)
(52) U.S. Cl.
    USPC ............... 340/10.2; 340/572.1; 340/572.4; 340/10.1; 340/10.3; 340/10.4; 370/329
(58) Field of Classification Search
    USPC ......... 340/568.1, 10, 572; 370/314, 329, 348, 370/455; 709/207
    See application file for complete search history.

(56) References Cited

U.S. PATENT DOCUMENTS

| | | | |
|---|---|---|---|
| 5,999,124 A | 12/1999 | Sheynblat | |
| 6,131,067 A | 10/2000 | Girerd et al. | |
| 6,185,427 B1 | 2/2001 | Krasner et al. | |
| 6,215,441 B1 | 4/2001 | Moeglein et al. | |
| 6,920,330 B2 | 7/2005 | Caronni et al. | |
| 7,397,381 B2 | 7/2008 | DiPiazza | |
| 7,697,155 B2 | 4/2010 | Ikegami et al. | |
| 7,978,050 B2 | 7/2011 | Moshfeghi | |
| 8,284,031 B2 | 10/2012 | Moshfeghi | |
| 2004/0249250 A1 | 12/2004 | McGee et al. | |
| 2005/0030160 A1 | 2/2005 | Goren et al. | |
| 2005/0088284 A1 | 4/2005 | Zai et al. | |
| 2005/0093702 A1* | 5/2005 | Twitchell, Jr. ............. | 340/572.8 |
| 2005/0198228 A1 | 9/2005 | Bajwa et al. | |

(Continued)

FOREIGN PATENT DOCUMENTS

WO    WO 2005/091997    10/2005

OTHER PUBLICATIONS

Portions of prosecution history of U.S. Appl. No. 11/809,013, Jun. 10, 2011, Moshfeghi, Mehran.

(Continued)

*Primary Examiner* — Mohammad Ghayour
*Assistant Examiner* — Mark Rushing
(74) *Attorney, Agent, or Firm* — Adeli & Tollen LLP

(57) ABSTRACT

Embodiments of the present invention include systems and methods for providing Quality of service to RFID. In one embodiment the present invention includes a method of providing quality of service in an RFID network comprising storing RFID priority information corresponding to the RFID network, wherein the RFID network comprises one or more tags and one or more readers mapping the RFID priority information into priority information corresponding to a second network.

20 Claims, 8 Drawing Sheets

(56) References Cited

U.S. PATENT DOCUMENTS

2005/0242188 A1 11/2005 Vesuna
2006/0280181 A1 12/2006 Brailas et al.
2007/0109117 A1* 5/2007 Heitzmann et al. ...... 340/539.12

OTHER PUBLICATIONS

Portions of prosecution history of U.S. Appl. No. 13/180,371, Sep. 4, 2012, Moshfeghi, Mehran.
Author Unknown, "Cisco Application-Oriented Networking Facilitates Intelligent Radio Frequency Identification Processing at the Edge," Month Unknown, 2005, 9 pages, Cisco Systems, Inc.
Author Unknown, "ConnecTerra Product Family," www.connecterra.com, Month Unknown, 2005, pp. 1-2, ConnecTerra Inc., Cambridge, MA, USA.
Author Unknown, "Configuring Custom Queueing," Cisco IOS Quality of Service Solutions Configuration Guide, Date Unknown, Published before Nov. 12, 2006, pp. 103-108.
Author Unknown, "Configuring Priority Queueing," Cisco IOS Quality of Service Solutions Guide, Date Unknown, Published before Nov. 12, 2006, pp. 109-112.
Author Unknown, "Delivering an Intelligent Foundation for RFID: Maximizing Network Efficiency With Cisco RFID Solutions," Month Unknown, 2005, pp. 1-6.
Author Unknown, "Establishing the Foundation for Enterprise-Scale RFID Deployments," www.connecterra.com/products/rftagaware.php, Month Unknown, 2004, pp. 1-2, ConnecTerra, Inc.
Author Unknown, "Four Challenges," Month Unknown, 2004, pp. 1-7, ConnecTerra, Inc.
Author Unknown, "Inter-PLMN Backbone Guidelines 3.7," GSM Association Official Document: IR.34, Apr. 4, 2006, 40 pages, GSM Association.
Author Unknown, "Installation Manual R500HA Long Range RFID Reader," www.iautomate.com, Month Unknown, 2005, pp. 1-40.
Author Unknown, "The Sun Global RFID Network Vision: Connecting Businesses at the Edge of the Network," A Technical White Paper, Jul. 2004, 20 pages, Sun Microsystems, Inc., Santa Clara, CA, USA.
Author Unknown, "RFTag Aware™ Enterprise Server: Centralized EPC Data Management and Reporting for Enterprise-Scale RFID Deployments," www.connecterra.com, Month Unknown, 2005, pp. 1-2, ConnecTerra, Inc., Cambridge, MA, USA.
Author Unknown, "Wireless / Mobile 802.11e," Specification approved by the IEEE, Month Unknown, 2005, pp. 1-4, Network World, Inc.
Clark, Sean, et al., "Auto-ID Savant Specification 1.0," Sep. 1, 2003, pp. 1-58, Auto-ID Center.
Kim, Jong-Deok, et al., "Performance Analysis and Evaluation of IEEE 802.11e EDCF," Wireless Communications and Mobile Computing, Month Unknown, 2004, pp. 55-74, John Wiley & Sons, Ltd.
Miller, Leonard E., "Why UWB? A Review of Ultrawideband Technology," National Institute of Standards and Technology, DARPA, Apr. 2003, pp. ii-iv, 1-72, Gaitherburg, Maryland, USA.
Miller, Leonard E., "Wireless Technologies and the SAFECOM SoR for Public Safety Communications," National Institute of Standards and Technolgy, Month Unknown, 2005, pp. ii-viii, 1-68, Gaithersburg, Maryland, USA.
Morgan, Brian, et al., "CCNP BCRAN Self Study: Managing Network Performance with Queuing and Compression," Dec. 23, 2003, pp. 1-6, Pearson Education, Cisco Press, Indianapolis, Indiana, USA.
Nichols, K., et al., "Definition of the Differentiated Services Field (DS Field) in the IPv4 and IPv6 Headers," Network Working Group, Request for Comments 2474, Dec. 1998, pp. 1-18, The Internet Society.
Reynolds, Matthew, et al., "Design Considerations for embedded software-defined RFID Readers," Emerging Wireless Technology/A Supplement to RF Design, Aug. 2005, pp. 14-15.
Stallings, William, "Quality of Service (QoS) for Local Ar," Prentice Hall, Feb. 15, 2002, pp. 1-4, Pearson Education, Informit, Indianapolis, Indiana, USA.

* cited by examiner

SYSTEMS AND METHODS FOR PROVIDING QUALITY OF SERVICE TO RFID

CLAIM OF BENEFIT TO PRIOR APPLICATIONS

This application is a continuation application of U.S. patent application Ser. No. 13/180,371, filed Jul. 11, 2011, now issued as U.S. Pat. No. 8,284,031. U.S. patent application Ser. No. 13/180,371 is continuation application of U.S. patent application Ser No. 11/809,013, filed May 30, 2007, now issued as U.S. Pat. No. 7,978,050. The contents of U.S. Pat. No. 8,284,031 and U.S. Pat. No. 7,978,050 are hereby incorporated by reference.

BACKGROUND

The present invention relates to radio frequency identification ("RFID"), and in particular, to systems and methods for providing quality of service ("QoS") to RFID.

Radio Frequency Identification (RFID) is a wireless technology that uses electronic tags for storing data. RFID tags are read when they are close to a transmitted radio signal from an RFID reader. RFID readers manage RFID tags and pass their information onto network servers, corporate databases and business applications. The readers typically act like a gateway between the tags and the corporate servers/databases by providing an RF interface to the tags on one side and another network interface on the other side.

As the price of tags drops, RFID tags will become prevalent in the future and as such will provide large volumes of network traffic through the readers. RED applications include short range and long range communication and cover areas such as supply chain automation, asset tracking, medical smartcard applications, people tracking, manufacturing parts tracking, supermarket active shelves and trolley tracking, warehouse inventory management, security and access control, and livestock tracking. Telemetry applications include gathering data for temperature, motion, sound, video, light and moisture. RFID data from these different industries and have different requirements in terms of guaranteed delays and required bandwidth. Since network bandwidth is limited and congestions can occur it is important to differentiate between different types of RFID network traffic. A best effort type of RFID network is not acceptable for mission critical RFID data because it does not provide for guaranteed bandwidth or priority-based treatment of RFID data. It is therefore necessary to provide QoS for RFID data where the accuracy and urgency of the RFID data is important.

The present invention provides systems and methods for providing quality of service ("QoS") to RFID to improve RFID network performance.

SUMMARY

Embodiments of the present invention include systems and methods for providing Quality of Service to RFID. In one embodiment the present invention includes a method of providing quality of service in an RFID network comprising storing RFID priority information corresponding to said RFID network, wherein the RFID network comprises one or more tags and one or more readers, and mapping the RFID priority information into priority information corresponding to a second network.

In one embodiment, the RFID priority information is stored on one or more tags.

In one embodiment, the RFID priority information corresponding to one or more tags is stored on a reader.

In one embodiment, the RFID priority information comprises tag priority information and reader priority information.

In one embodiment, the RFID priority information corresponding to one or more tags is stored external to the tag.

In one embodiment, the RFID priority information corresponding to one or more tags is cached on an access point in the second network.

In one embodiment, the RFID priority information is stored on one or more readers.

In one embodiment, the RFID priority information is based on attributes of the RFID network.

In one embodiment, the attributes of the RFID network include the location of a reader, a time, or an application type.

In one embodiment, the second network is a wired local area network, a wireless local area network, or a cellular network.

In one embodiment, the mapping is specified by a mapping algorithm.

In one embodiment, the priority information for the second network is calculated based on the RFID priority information of the RFID network, the number of priority levels available on the RFID network, and the number of available priority levels on the second network.

In one embodiment, a reader modifies the RFID priority information stored on a tag.

In one embodiment, the reader updates RFID priority information stored on the reader corresponding to the tag.

In one embodiment, the reader transmits the modified RFID priority information on the tag to one or more other readers.

In another embodiment, the present invention includes a method of providing quality of service in an RFID network comprising receiving an RFID event on an RFID reader, associating first priority information with the RFID event, and executing the RFID event on said RFID reader based on the first priority information.

In one embodiment, the method further comprises associating second priority information with the RFID event on a network external to said RFID network, sending the RFID event and second priority information to said RFID reader, and executing the RFID event based on the first and second priority information.

In one embodiment, the first priority information is stored on the reader.

In one embodiment, the first priority information is stored external to the reader.

In one embodiment, the first priority information comprises tag priority information.

In one embodiment, the first priority information comprises reader priority information.

In one embodiment, the first priority information comprises tag and reader priority information.

In another embodiment, the present invention includes a system including an RFID network comprising one or more RFID readers coupled to at least one second network over a communication channel, a plurality of RFID tags coupled to at least one of the RFID readers, and RFID priority information, wherein the RFID reader prioritizes processing RFID information based on the RFID priority information.

In one embodiment, the RFID information comprises RFID events received from the second network, and wherein the RFID reader receives an RFID event, associates RFID priority information with the RFID event, and executes the RFID event on said RFID reader based on the RFID priority information.

In one embodiment, the reader maps the RFID priority information into priority information corresponding to the second network.

In one embodiment, the RFID priority information is stored on the reader.

In one embodiment, the RFID priority information comprises tag priority information.

In one embodiment, the RFID priority information comprises reader priority information.

In one embodiment, one or more of the RFID readers are multimode readers with multiple radios, and wherein at least one RFID reader transmits and receives information using a first communication channel based on first RFID priority information, and wherein the at least one RFID reader transmits and receives information using a second communication channel based on second RFID priority information having a higher priority than the first RFID priority information.

In one embodiment, the first communication channel is a communication channel between the at least one RFID reader and another RFID reader, and the second communication channel is a communication channel between the at least one RFID reader and the second network.

These and other features of the present invention are detailed in the following drawings and related description.

DETAILED DESCRIPTION

Described herein are techniques for providing quality of service ("QoS") to RFID to improve RFID network performance. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
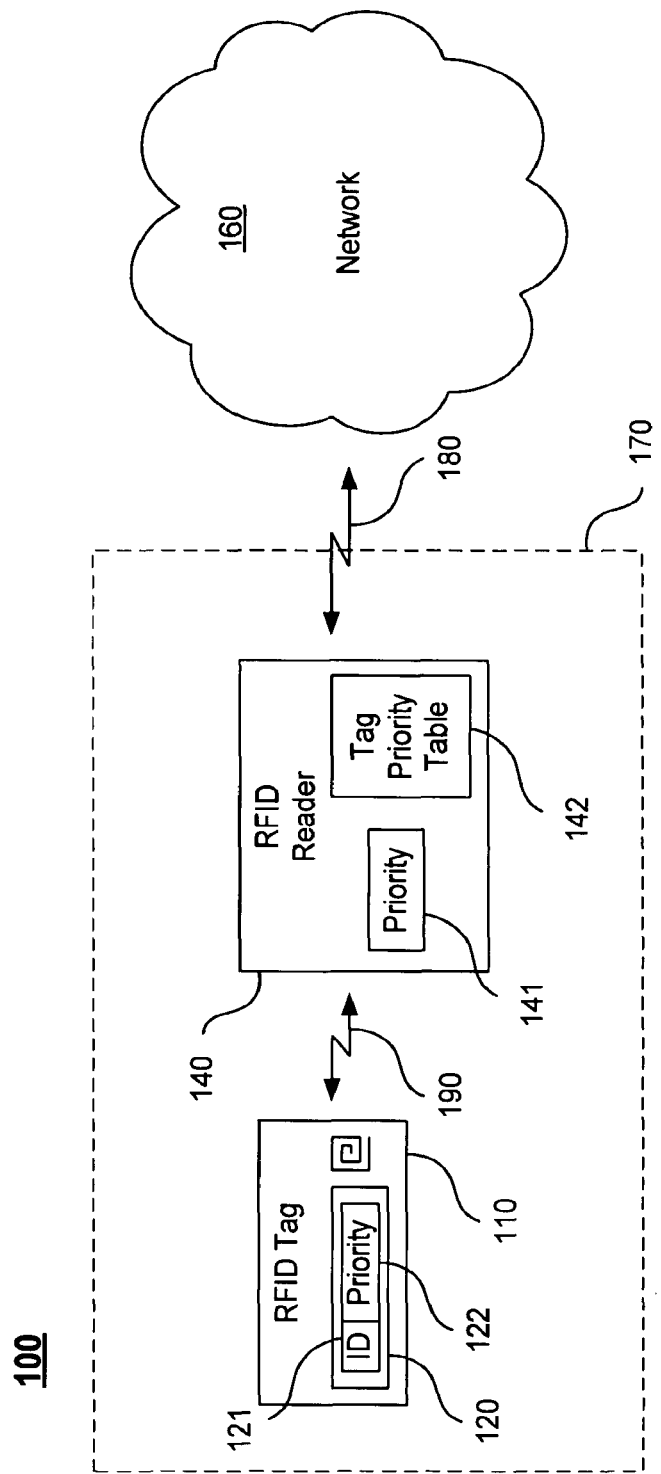
FIG. 1 illustrates a RFID system according to one embodiment of the present invention.

FIG. 1 illustrates a RFID system according to one embodiment of the present invention. RFID system 100 includes RFID network 170, which is coupled to another network 160. Network 160 may send commands to RFID network 170 through network channel 180. These commands may include RFID events, which are used to retrieve data from RFID tags. By altering the order and time these RFID events are executed, the RFID network may provide QoS to the RFID system. QoS refers to a defined level of performance in a data communications system. In the absence of QoS, networks typically operate on a best effort scheme where all packets have equal priority regardless of content and there are no guarantees regarding reliability, delay, and throughput. Thus, if the network experiences congestion, all packets are equally likely to be dropped. QoS, on the other hand, provides priority-based treatment of certain traffic. This decreases the likelihood of loss in high priority packets. Depending on the type of data being retrieved, QoS requirements may differ. For example, video and voice services can typically tolerate some error rates but require low delivery delays, while business critical traffic is not time-critical but is loss-sensitive. To ensure that real-time voice and video are delivered without undue delay, a guarantee of bandwidth may be required. This may be accomplished by giving network priority to real-time data over non real-time data. By providing higher priority/network bandwidth to high priority RFID events over lower priority RFID events as well as non-priority network traffic (e.g., TCP-based events), QoS for RFID data may be beneficial to critical RFID applications and information. Another advantage of QoS in RFID networks is higher prioritization of time consuming operations within the RFID network or second network so that time-sensitive data from tags may get to their destinations as quickly as possible.

RFID network 170 comprises RFID tag 110 and RFID reader 140. As commands comprising RFID events are received by the RFID network, a priority level may be attached to each event. Depending on the priority level, the RFID events may be performed in an order different than the order they are received. Therefore, higher priority RFID events may be completed faster than other RFID events. The priority level of an RFID event may be dependent on RFID priority information corresponding to the RFID network. To remain scalable in anticipation of large volumes of RFID data in the future, the priority level may take into consideration a variety of RFID priority information stored in a variety of locations. For example, factors of the RFID event such as the location and importance of the RFID tags and readers may affect the priority level.

The RFID priority information may be stored in a variety of locations. In one embodiment, RFID priority information is externally cached. For example, RFID priority information may be stored within another network 160 coupled to the RFID network 170. In one embodiment, RFID priority information of the RFID network is stored within RFID network 170. In one example embodiment, the RFID priority information is stored within the RFID tag. The RFID tag may also be encoded and the encoding scheme may include a header field followed by one or more value fields. At 121, the header may store the ID of the RFID tag. The header may also define attributes such as the overall length and format of the value fields, while the value fields may contain RFID data. In one example, the header field is modified to include RFID priority information corresponding to the RFID tag ("tag priority information"). This is illustrated in FIG. 1 by RFID tag 110 where header field 120 of RFID tag 110 has been modified to include priority field 122. This priority field may be used to store the tag priority information of RFID tag 110. In one embodiment, this tag priority information is a priority value stored in the tag as tag priority bits. In one example embodiment, the priority bits are written onto the tag's header before deployment by readers. In another example embodiment, the priority bits are written on the tag's header after deployment by readers. For example, a priority value of five may be given to security tags while a priority value of two may be given to retail inventory tags. In one embodiment, the priority bits are encoded for a more efficient representation of the priority. For example, the priority level of a RFID tag capable of eight different priority levels may be represented with three priority bits rather than eight. In another embodiment, the priority bits are left un-encoded for faster reading by the reader.

In one embodiment, RFID priority information is stored within the RFID reader. RFID priority information stored within the RFID reader may include tag priority information and priority information corresponding to the RFID reader ("reader priority information"), or both. For example, RFID reader 140 of FIG. 1 includes reader priority information at 141 and tag priority information 142, which may reside in a table, for example. Tag priority information 142 may store the tag priority information of all tags accessible to the reader. Both types of priority information may be considered prior to attaching a final priority level to the RFID event. Reader priority information may include the importance of the data accessed by the reader, the location of the reader, and the applications supported by the reader. For example, the commands and tag reads of important locations from a RFID security application reader may be given higher priority over low priority tag reads and low priority traffic. This reduces the chance that high priority packets experience significant delays or drops in congested networks.

Readers may be mobile or they may be fixed in location. For example, the readers could be integrated into existing products such as cellular phones, PDAs, laptops, wireless game consoles, etc. RFID reader 140 communicates with network 160 through network channel 180. Network channel 180 may be a wired local area network, a wireless local area network (i.e., Bluetooth, Ultra-WideBand (UWB), WiMax, Zigbee, and other ad-hoc/mesh network technologies), or a cellular network (i.e., GPRS, CDMA, GSM, CDPD, 2.5G, and 3G). The network support between the reader and the network may include standard protocols (i.e., TCP/IP, UDP, http, SNMP). Since data is being passed from one network to another, priority levels available in the RFID network may be different than the priority levels available in the secondary network due to differences within the QoS techniques used. Therefore, mapping between the two sets of priority levels may be required to ensure that high priority data may travel through network 160 with the same or similar urgency as it did in RFID network 170. In one embodiment, the RFID reader maps priority information corresponding to the RFID network into priority information corresponding to network 160. Once the data has been mapped, the reader may pass on the data to network 160 and move on to processing the next RFID event.

QoS mechanisms such as those specified in the Wireless LAN 802.11e standard, cellular 3GPP Class of Service (CoS) methods, and wired QoS with IP precedence and Class of Service (CoS) are discussed in the Appendix. RFID networks according to various embodiments of the present invention may include mapping priorities between the RFID network and any one of these QoS mechanisms. Briefly, the WLAN 802.11e standard defines eight levels of priority: two for voice, three for video, two for background, and one for best effort. The 3GPP standard defines four classes for QoS: conversational, streaming, interactive, and background. Wired QoS with IP precedence and CoS define eight levels of service: best effort, four assured forwarding levels, expedited forwarding, Internet and network.

Figure 2A:
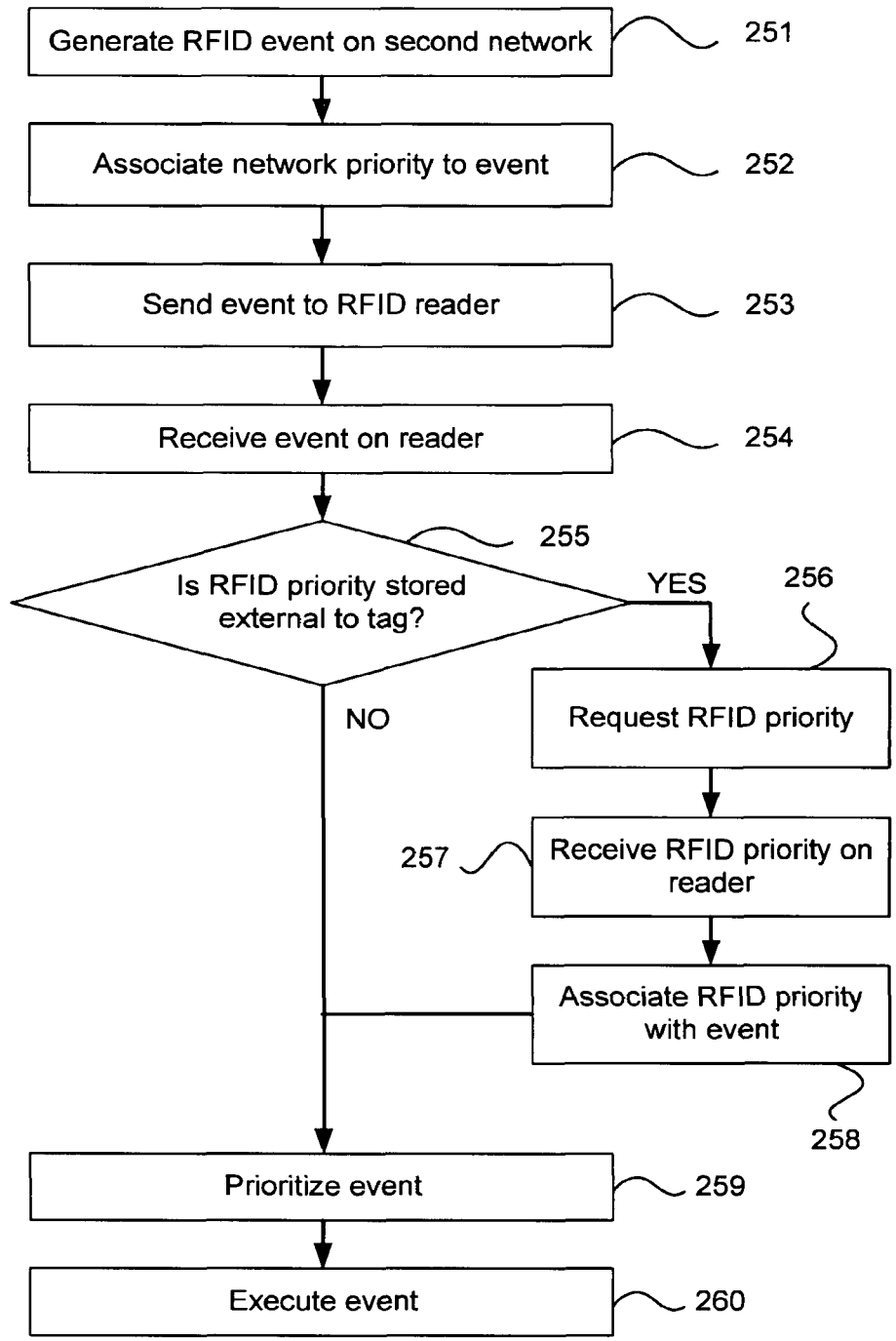
FIG. 2A illustrates a method of providing QoS for downstream data in a RFID system according to one embodiment of the present invention.

FIG. 2A illustrates a method of providing QoS for downstream data in a RFID system according to one embodiment of the present invention. At 251, a RFID event is generated on a second network for retrieving information from a RFID network. In one example, this information is data from a RFID tag. Many RFID events may be grouped as a command sent to the RFID network. At 252, a network priority is associated to the RFID event. The network priority may illustrate the importance of the information to the second network. This may allow the second network to prioritize the execution of the RFID events by specifying a QoS level, for example. In one embodiment, the priority is a numerical value. For example, assume RFID events 1, 2, and 3 were assigned a first priority of 2, 4, and 3, respectively. If higher values represent higher priority, the second network may wish RFID event 2 to be executed first, followed by RFID event 3 and RFID event 1. At 253, the RFID event is sent to the RFID reader. The event may be transmitted on a transmission channel such as a wired local area network, a wireless local area network, or a cellular network. At 254, the event is received on the reader. Once received, the reader may perform a query to determine if a RFID priority corresponding to the RFID event exists external to the tag, at 255. In one example, this priority is located within a table stored on the reader. RFID priority information may include tag priority information (e.g., for one or more tags to be read) or reader priority information (e.g., based on a reader's location). In another example, this priority is located on the second network. If a RFID priority does exist, the reader may request the RFID priority at 256. The request may be transmitted on a transmission channel such as a wired local area network, a wireless local area network, or a cellular network. Similarly, the RFID priority may be received on the reader by a similar transmission channel at 257. The reader may then associate the RFID priority with the RFID event at 258. Association may include combining the network priority with the RFID priority to calculate the priority of the event. The event may be prioritized against other events on the reader according to the calculated priority at 259. In one embodiment, the prioritization places the event in a queue based on the calculated priority. At 260, the event has reached the top of the queue and therefore, may be executed by transmitting a signal to the RFID tag requesting data.

Figure 2B:
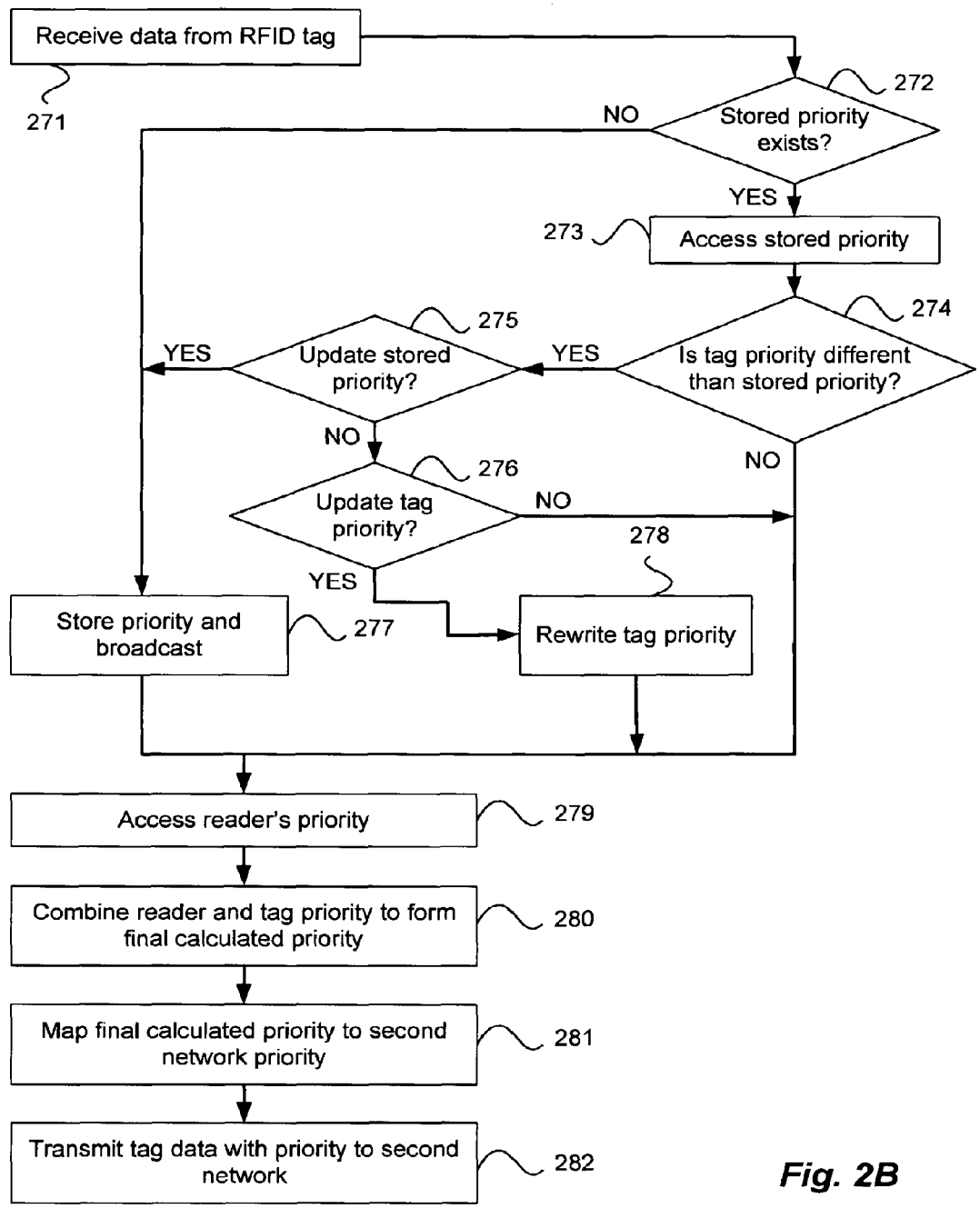
FIG. 2B illustrates a method of providing QoS for upstream data in a RFID system according to one embodiment of the present invention.

FIG. 2B illustrates a method of providing QoS for upstream data in a RFID system according to one embodiment of the present invention. At 271, data may be received on the reader from the RFID tag. This data may include RFID tag attributes such as tag ID and priority information. At 272, the reader may determine if an externally stored priority exists. Storing the priority of previously read tags may improve the QoS of the RFID system. This information may provide the reader priority information of the tag without accessing the tag itself. In one example, the externally stored priority is the RFID priority in FIG. 2A. If the stored priority does not exist, then the reader may store the priority at 277. In one example, the reader may store the priority of the tag along with the tag ID in a table within the reader. In another example, the reader may transmit the priority of the tag along with the tag ID through a transmission channel to a remote location such as an access point or a secondary network. The system may also broadcast the priority of the tag, thereby allowing others to update their stored copy of the priority of the tag. For example, other readers may synchronize a change in the tag's priority with their copy of the tag's priority. If the stored priority does exist, the reader may access the stored priority at 273. At 274, the reader may determine if the priority of the tag is different than the priority stored external to the tag. A discrepancy between the priority stored externally and the priority stored on the tag may indicate a correction is required. At 275, the reader may determine if the externally stored priority should be updated. In one example, the externally stored priority is out of synchronization with the priority on the tag because another reader has changed the tag's priority without updating the externally stored priority. If an update is required for the stored priority, the reader may store the priority taken from the RFID tag. The reader may also broadcast the priority to other readers at 277. At 276, the reader may determine if the priority on the tag should be updated. In one embodiment, the reader may conclude, based on surrounding circumstances, that the priority stored on the tag is incorrect. For example, the tag with a high priority may have moved to a less important location. In another example, a tag with low priority may be attached to an expensive jewelry item, therefore requiring a higher tag priority. If an update is required on the tag priority, a rewrite may be triggered at 278. In one embodiment, the rewrite may propagate the externally stored priority to the tag's priority. In one example, the reader transmits the externally stored priority to the RFID tag through a transmission channel such as a wired local area network, a wireless local area network, or a cellular network. Once the priority of the tag has synchronized with the rest of the system, the reader may access its own priority at 279. At 280, the priority of the reader and the priority of the tag may form a final calculated priority. Functions such as maximum, minimum, average, median, sum, tag-determines and reader-determines are examples of functions that could be used to combine tag and reader priorities. At 281, the final calculated priority from 280 may be mapped to a priority on the second network. Since the set of possible priorities may vary depending on the network, mapping may allow networks to communicate priority information with one another. At 282, the reader may transmit the RFID tag data along with the mapped priority to the second network through a transmission channel. With the mapped priority, the second network may continue to forward the tag data to its destination with an urgency based on the priority of the data.

Figure 2C:
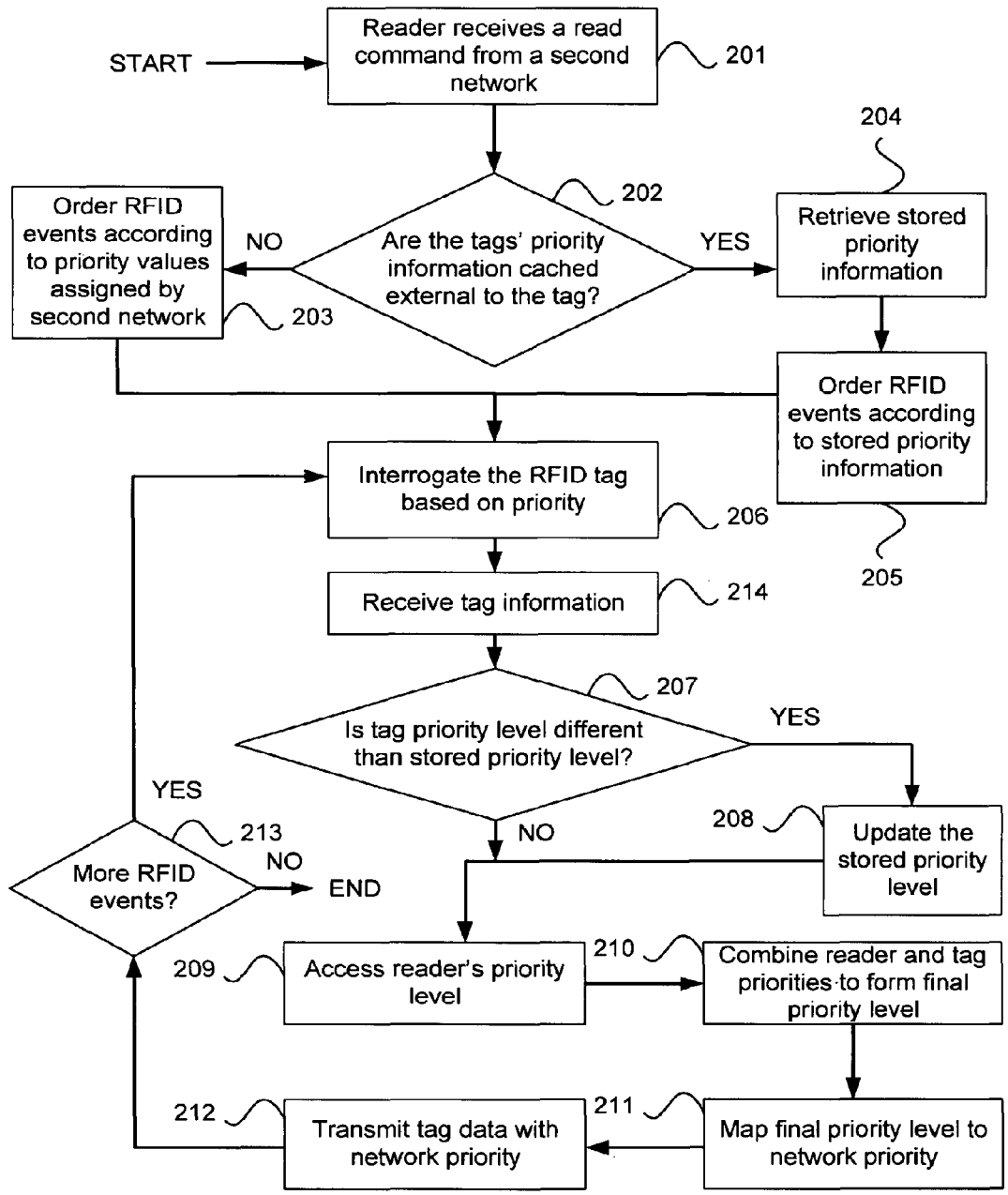
FIG. 2C illustrates a method of providing QoS in a RFID system according to one embodiment of the present invention.

FIG. 2C illustrates a method of providing QoS in a RFID system according to one embodiment of the present invention. At 201, a RFD reader may receive a read command from a second network. Commands to the readers can originate from an access point/base-station, router, or server controller, for example. A read command may include many RFID events to retrieve information from many RFID tags accessible to the RFID reader. These RFID events may contain a priority value for implementing QoS during the transmission of the command from the network to the reader. Introducing QoS during the transmission of the command may reduce the occurrence of significant delays or drops of high priority data in congested networks by allowing high priority commands and RFID events priority over lower priority commands. These priority values may be based on the QoS method implemented in the second network. The network node within the second network that initiates the command to the RFID reader may set the command's priority to the appropriate priority level. This priority level set by the second network may be in a format that is understood by the RFID reader. In one embodiment, the second network that initiates the command to the RFID reader sets the priority to a format understandable by the reader. In another embodiment, the reader receives the priority value in the format used in the second network and maps the priority to a format understandable by the reader. If a router or a server controller initiates the command instead of the access point, then such devices may set the priority level.

At 202, the reader may determine if the tags' priority information is stored external to the tag (e.g., in a cache). For example, as described above, the tag priority information may be stored within the RFID reader. In one embodiment, tag priority information is stored in cache memory for faster access. This information may be used in determining the order the reader interrogates the tags associated with each RFID event. If the tag priority information is stored external to the tag, the reader may retrieve the stored tag priority information. This tag priority information retrieval may occur at 204. At 205, the reader may order the RFID events according to the stored tag priority information. In one embodiment, the reader may order the RFID events into a list. In one embodiment, this organization of RFID events also takes into consideration the reader priority information. In one example, suppose the reader receives a command to interrogate tags 1, 2, and 3. This may be represented as RFID events 1, 2, and 3. If the command does not impose a preference for an order, the reader can determine the order. This order may be determined by the stored tag priority information available to the RFID reader. When a reader interrogates a tag for the first time, it may store the tag's ID and its priority information. The priority information may be stored in various data structures such as lists, queues, and tables. In one example, the second network may also optionally store the ID and priority information of the tags (i.e., in an access point). The next time the reader interrogates that tag, it may check the priority of that tag and compare it to the priority of other tags waiting for interrogation to determine the order they will be interrogated. For example, suppose that tags 1, 2, and 3 have previously been read by this reader and have priority levels of 2, 5, and 1, respectively, stored in the reader. The reader may interrogate the tags in the following order: tag 2, tag 1, and tag 3 where 5 is a higher priority than 1 and send the data it reads to the network in that order. Thus, the higher priority tags get processed before the lower priority tags. This may translate to improved QoS in the RFID system.

If the tag priority information is not stored external to the tag (i.e., cached in the reader), the reader may order the RFID events according to the priority value assigned to the RFID events by the second network. This reorganization may occur at 203. In one example, the organization of RFID events also takes into consideration the reader priority information. In the case where the reader receives a command to interrogate a number of tags that it has not interrogated before and the RFID events do not contain a priority value, the reader may interrogate the RFID tags in random order. Once the tag information has been received by the reader, the tags' priority information may be cached by the reader for future QoS-based interrogations. If the command received from the second network contains tags with and without priority information stored external to the tag, a combination of the methods described above may be used in ordering the RFID events.

At 206, the reader may interrogate the RFID tag according to the RFID event with the highest priority. Interrogation may include sending signals to the RFID tag and receiving data from the RFID tag at 214. As described above, this data may include tag priority information, tag ID, and tag attributes. After the reader has read a particular tag and examined the priority level of that tag, the reader checks the tag's stored priority level at 207. Here, the reader may compare the priority level stored on the tag with the tag's stored priority level. In one example, the tag's stored priority level is stored in the reader's cache memory. If the tag's priority level has not been stored (e.g., if this tag has not been read before by this reader), the reader may store the priority level of this tag. In one example, this may include the reader caching the ID and priority of the tag. This enables future QoS-based interrogation of that tag by this reader. If the tag's priority level has been stored, the reader may check to see if that priority level has changed. In one embodiment, changes in the actual and stored priority level may lead the reader to update the actual priority level of the RFID tag at 208. For example, differences between the actual and stored priority values may occur when another reader has edited the priority level of the tag but did not broadcast the change to other readers. In another example, the reader may determine (e.g., via programming) that the priority level on the tag should be changed and may overwrite the priority level on the tag to change the priority. This may include the situation where the RFID tag has moved to a less critical location, for example. Yet another example is where a reader reads several RFID tags and as a result of the priority values of all the tag reads, concludes that one or more priorities need to be changed.

The reader's priority level may be accessed at 209. In RFID applications, the reader may provide a priority based on certain criteria. Such priorities are referred to as priority values or levels. In one example, readers can have pre-assigned location priorities, with the actual location of the reader being updated via GPS, for example. Other parameters that can affect a reader's priority include time and the type of application. In one embodiment, the reader's priority level is stored on the reader itself. This may allow for quick access to the reader's priority information. In another embodiment, the reader's priority level is stored elsewhere within the RFID network (e.g., in a central repository). This may remove the necessity of updating neighboring readers if a reader changes its priority level. At 210, the reader priority level may be combined with the tag priority level to form a final priority, which is an optional step useful in some applications. In one embodiment, the priority information is combined through RFID application software within the RFID reader. For example, consider the case where the both the reader and the tag include 8 different possible priority values. This means there are 64 possible tag-reader priority combinations.

TABLE 1

Examples of tag and reader priority values, and final priority levels calculated with three different functions.

| Tag Priority Value | Reader Forwarding Value | Final Priority Level (Function: Tag Determines) | Final Priority Level (Function: Reader Determines) | Final Priority Level (Function: Max of Tag and Reader) |
|---|---|---|---|---|
| 2 | 5 | 2 | 5 | 5 |
| 4 | 3 | 4 | 3 | 4 |

Table 1 shows 2 of the 64 possible combinations to illustrate the optional process of combining the reader priority level with the tag priority level. In the first row, the tag and reader levels are 2 and 5, respectively. In the second row, the levels are 4 and 3, respectively. The third column of Table 1 illustrates the case where the final priority level calculated by the reader is the tag value (i.e., the reader levels are ignored). The fourth column is the opposite case where the reader priority value determines the final calculated priority level (i.e., tag levels are ignored). The latter may also apply to situations where there are no tag priority bits and hence, by default, the reader priorities determine the final priority levels. The last column is an example where both tag and reader levels are used to arrive at the final calculated priority level. In this example, the function used to combine the levels is P=Max(tag, reader), where the larger of the tag and reader levels is assigned to the final calculated priority level. In other examples, the function used to combine the levels may include minimum, average, median, sum, etc. The RFID application can play a role in determining how tag and reader priorities are combined. For example, the application logic can determine what function is used to combine reader and tag priorities. Some applications may provide more weight to tag priorities while others may provide more weight to reader priorities. In one embodiment, the reader may not contain its own priority level, allowing the tag priority level to become the final priority level.

At 211, the RFID reader may map the priority information of a tag to priority information in a second network, herein referred to as a network traffic class. The reader may access the descriptions of the network traffic classes and forward data to the rest of the second network (wireless or wired). Information about the second network's available priorities may provide the reader with the information necessary to perform the mapping function. In an alternative embodiment, components of the second network such as access points or cellular base stations may perform the mapping function by retrieving the necessary information from the reader. Although this may prevent QoS in the transmission channel between the RFID network and the second network, QoS may still be applied within the second network. Therefore, the lack of QoS is exchanged for a lower computation load on the reader.

In one embodiment, the information required to perform the mapping function may include the number of network traffic classes available. The number of available network traffic classes depends on the type of network that the reader is connecting to. Some examples are WLAN access point with 802.11 e support, QoS-enabled cellular base-station with 3GPP, and wired QoS with IP precedence/CoS (The latter wired network case applies to fixed location readers that are connected to a LAN and do not need wireless access). In one example, the priority levels of the tags are represented by 3 bits. Therefore, there are 8 possible tag priority levels that may be mapped into available network traffic classes. In another example, 2 tag priority bits are used to represent 4 tag priority levels.

In one embodiment, there may be a one-to-one mapping between tag priority levels and network traffic classes. The one-to-one mapping may map the highest priority level on the RFID network to the highest priority traffic class on the second network. This may continue until the lowest priority level on the RFID network is mapped to the lowest priority traffic class. In one example embodiment, eight final priority levels from the RFID network are mapped to a second network using the IEEE 802.1D standard. The 802.1D standard is the IEEE Media Access Control (MAC) bridges standard and is standardized by the IEEE 802.1 working group. The 802.1D standard provides the following seven types of traffic, where the numbers in parentheses are the traffic class values corresponding to each traffic type if there are eight queues available at a given output port. The standard leaves as spare an eighth type, which could be used for traffic of more importance than background but less importance than best effort.

Network control (7): Both time-critical and safety-critical, consisting of traffic needed to maintain and support the network infrastructure, such as routing protocol frames.

Voice (6): Time-critical, characterized by less than 10 ms delay, such as interactive voice.

Video (5): Time-critical, characterized by less than 100 ms delay, such as interactive video.

Controlled load (4): Not time-critical but loss-sensitive, such as streaming multimedia and business-critical traffic. A typical use is for business applications subject to some form of reservation or admission control, such as capacity reservation per flow.

Excellent effort (3): Also not time-critical but loss-sensitive, but of lower priority than controlled load. This is a best-effort type of service that an information services organization would deliver to its most important customers.

Best effort (2): Not time-critical or loss-sensitive. This is LAN traffic handled in the traditional fashion.

Background (0): Not time-critical or loss-sensitive, and of lower priority than best effort. This type includes bulk transfers and other activities that are permitted on the network but that should not impact the use of the network by other users and applications.

In one embodiment, there may be a many-to-one mapping between priority levels in the RFID network and the second network. The difference in the number of priority levels available in the RFID network and second network may be due to the QoS standards used in the different networks or certain portions of the second network are non-operational or under repair. This may lead to a situation where multiple tag priority levels map to a single network traffic class. Table 2 illustrates one example of mapping eight priority levels into a variety of available network traffic classes. The table shows one example mapping when there are 8 or fewer traffic classes/queues available. In the first column, only one network traffic class/queue is available so all priorities are mapped into that class/queue. In the second column, there are two classes/queues available. Here, the higher 4 priority levels are assigned to the higher priority class/queue and the lower 4 priority levels are assigned to the lower priority class/queue. The remaining rows of the table can be explained similarly. This illustrates one example mapping however other mappings may also be applied.

TABLE 2

Example of mapping final calculated priorities into network classes/queues

| | | Number of Available Network Traffic Classes/Queues | | | | | | |
|---|---|---|---|---|---|---|---|---|
| | | 1 | 2 | 3 | 4 | 5 | 6 | 7 | 8 |
| Final | 0 (default) | 0 | 0 | 0 | 1 | 1 | 1 | 1 | 2 |
| Calculated | 1 | 0 | 0 | 0 | 0 | 0 | 0 | 0 | 0 |
| Priority | 2 | 0 | 0 | 0 | 0 | 0 | 0 | 0 | 1 |
| | 3 | 0 | 0 | 0 | 1 | 1 | 2 | 2 | 3 |
| | 4 | 0 | 1 | 1 | 2 | 2 | 3 | 3 | 4 |
| | 5 | 0 | 1 | 1 | 2 | 3 | 4 | 4 | 5 |
| | 6 | 0 | 1 | 2 | 3 | 4 | 5 | 5 | 6 |
| | 7 | 0 | 1 | 2 | 3 | 4 | 5 | 6 | 7 |

At 212, the reader may transmit the data received at 214 along with the mapped network traffic class generated at 211 to the second network. Once received by the second network, the data may be distributed across the network. The urgency in delivering the data will depend upon the priority of the network traffic class. At 213, the reader may check for further events. If all events have been processed, then the reader has completed processing the command. If there are more events, the reader may interrogate the next RFID event. This occurs at 206. This sequential processing of the RFID events may continue until all RFID events associated with the received command are processed. The reader may then receive the next command in the queue, or if there are no commands, it may enter an idle state until a new command is received.

Figure 3:
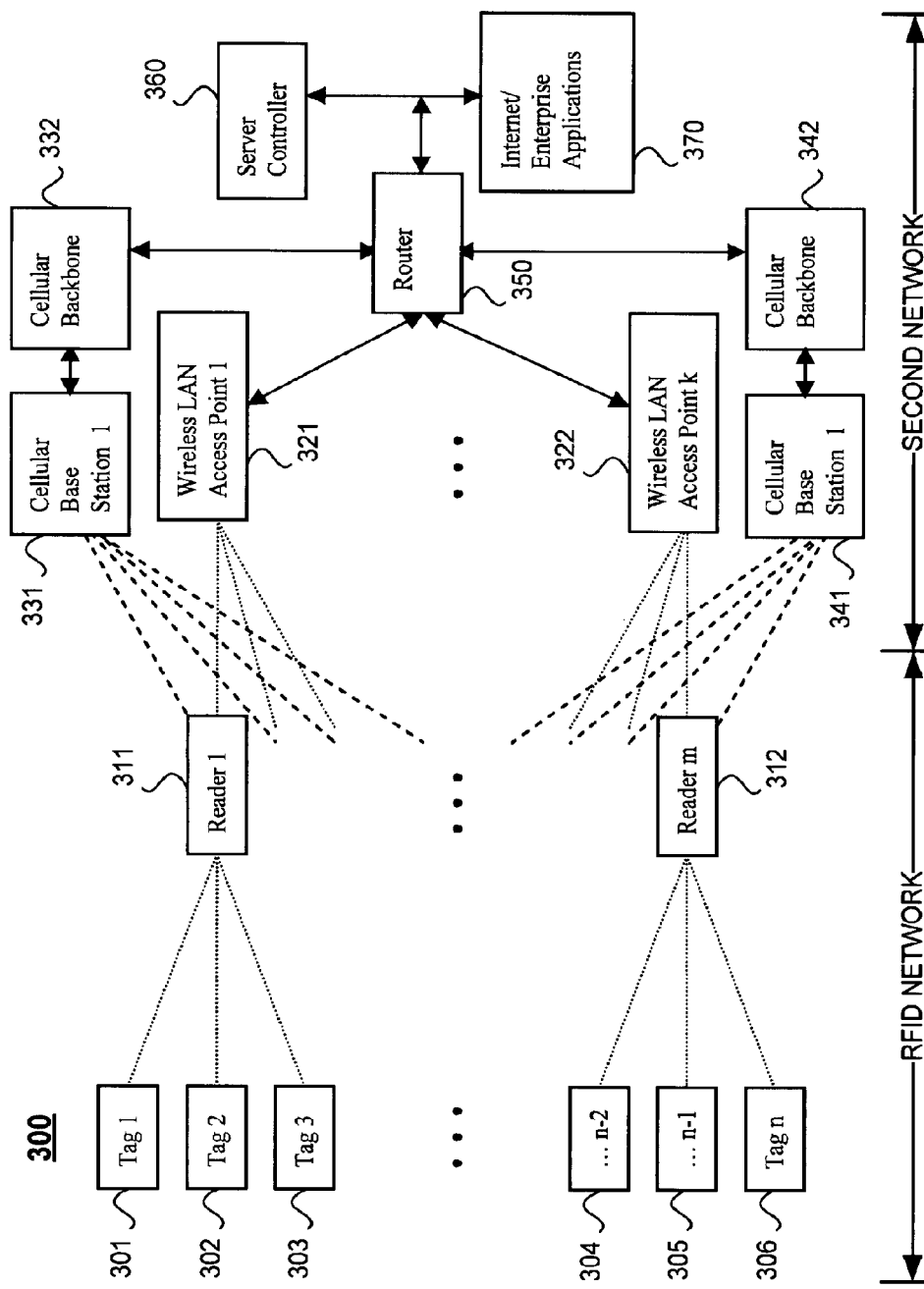
FIG. 3 illustrates a RFID system according to one embodiment of the present invention.

FIG. 3 illustrates a RFID system according to one embodiment of the present invention. RFID system 300 comprises a RFID network and another network (i.e., a second network). RFID middleware and application software for implementing RFID processes may have components distributed across the reader, access point/base-station, router, and server controller for QoS support. Application software may be located on top of RFID middleware. In one example, both middleware firmware and application software may be updated by downloading newer versions from the network. RFID networks may include RFID readers coupled to RFID tags through wireless technology, such as backscattering, for example. In this example embodiment, RFID system 300 includes a RFID network comprising RFID tags 301 through 306 and RFID readers 311 through 312. Reader 311 may interact with RFID tags 301 through 303 while reader 312 may interact with RFID tags 304 through 306. RFID tags may also interact with multiple RFID readers. In one example, RFID tag 303 may communicate with RFID readers 311 and 312. This may occur in situations where a RFID tag is within the range of more than one RFID reader. The RFID readers are coupled to the second network through various methods. These may include wired local area network ("wired LAN") access point, wireless local area network ("wireless LAN") access point, and cellular base stations.

In one embodiment, the RFID network communicates with the second network through a wireless LAN access point (e.g., access points 321 or 322). Each wireless LAN access point may communicate with multiple readers. The access points may forward commands to the readers and retrieve data from the readers. In FIG. 3, internet/intranet enterprise application 370 or server controller 360 may initiate a command to interrogate a set of tags. This command may be received by a router 350 and may be transmitted to wireless LAN access points 321 or 322. The access point may then forward the commands to the appropriate RFID readers. In one example, router 350, server controller 360, and internet/intranet enterprise applications 370 all support QoS. Therefore, the commands may be received by the access points or readers in a different order than they were sent. The readers, equipped with wireless LAN radios, may interrogate the tags corresponding to the RFID events and read the data within the tag. In one example, each reader contains RFID middleware software that, amongst other things, may perform a filtering operation to filter duplicate and false tag reads. The readers forward the data they read/filter to access points. The WLAN access points may provide network security, encryption, authentication, and bridge/route the wireless traffic to a wired Ethernet network or the Internet via a router, for example.

The access points then forward the data to a router. In one embodiment, the router has additional middleware software components that may perform some data processing functions before forwarding the data to internet/intranet enterprise applications or server controllers where the RFID information is processed. In one example, the access points have some RFID middleware software components that, amongst other things, filters duplicate reads of the same tag by different readers. In one example, access points may also act as routers so router 350 may be implemented within wireless LAN access points 321 and 322. Since wired LAN behaves similarly to wireless LAN, the embodiments and examples described above also apply to wired LAN.

In one embodiment, the RFID network communicates with the second network through a cellular network. The cellular network may include cellular base station 331 and 341 and cellular backbone systems 332 and 342. Cellular backbone systems may route data received from RFID readers through the cellular infrastructure (e.g., using QoS) and into a data network to be received by router 350. It is to be understood that a variety of cellular networks with QoS may be used. As an example, cellular networks such as General Packet Radio Service (GPRS) or Cellular Digit Packet Data (CDPD) may be used to provide services such as packet switching. With packet switching, the routers determine different paths for each packet and a packet assembler reconstructs the received out of order packets back into order. In one example, cellular base stations and cellular backbone also support QoS. This may allow the cellular network to prioritize packets as they are received by the readers. The data may travel through the cellular backbone where it eventually is forwarded to routers on the internet. Although FIG. 3 illustrates cellular backbone 332 connected to the same router as wireless LAN access point 321, in practice it will be a different physical router. Since the cellular networks and wireless networks share many of the same traits, many of the functionalities illustrated above for wireless LAN may also be applied to cellular networks, and vice versa.

Figure 4:
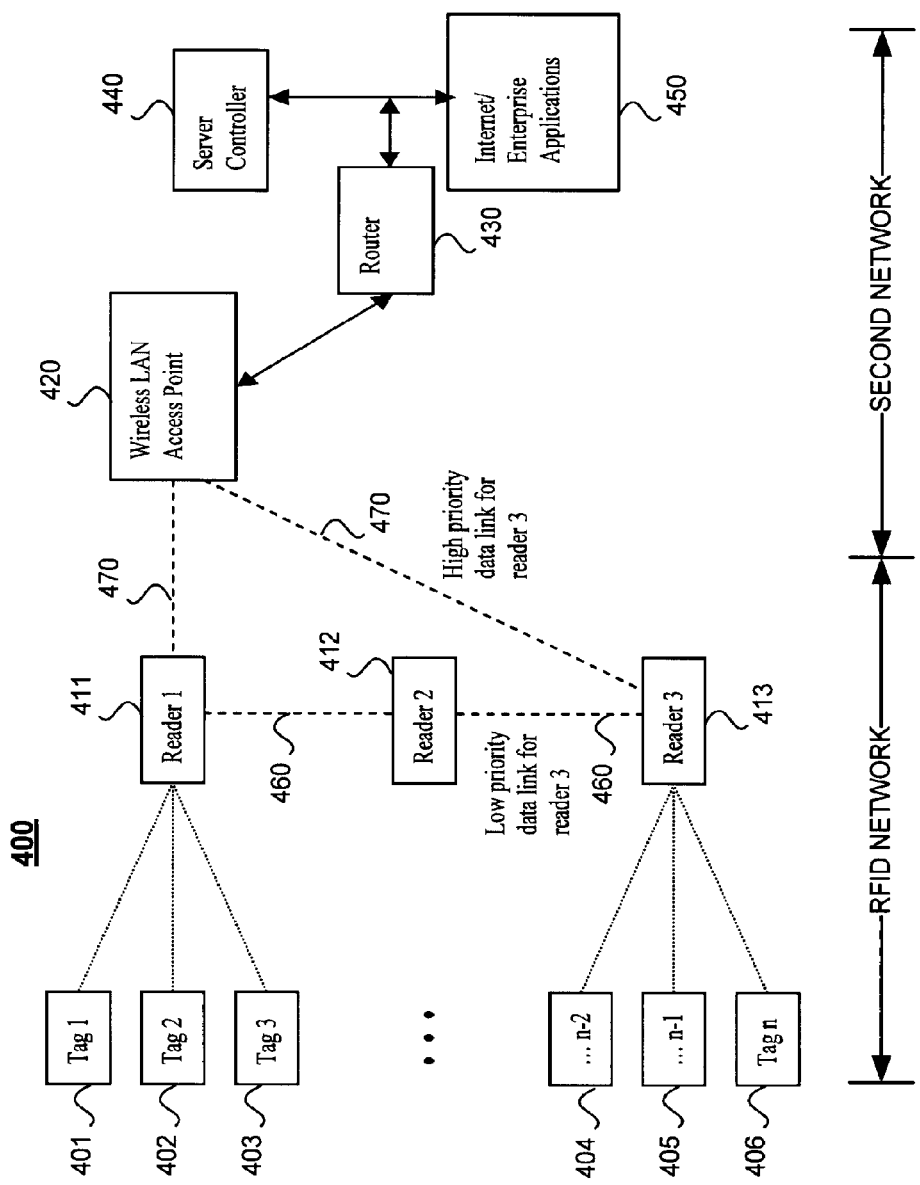
FIG. 4 illustrates a RFID system according to one embodiment of the present invention.

FIG. 4 illustrates a RFID system according to one embodiment of the present invention. RFID system 400 includes a RFID network and a second network. The second network comprises wireless LAN 420, router 430, server controller 440 and internet/enterprise applications 450. The behavior and performance of these components coupled in the configuration illustrated in FIG. 4 has been discussed in detail above in FIG. 3. The RFID network comprises RFID tags 401 through 406 and RFID readers 411 through 413. In one embodiment, RFID readers 411 through 413 are multimode radio readers. Multimode radio readers are readers equipped with multiple radios, thereby allowing them to communicate with more than one network. This may allow multimode radio readers to transfer and receive data from other readers. In this example embodiment, RFID readers 411 through 413 may communicate with one another through network communication channel 460 using one network protocol while RFID readers 411 and 413 may communicate with wireless LAN access point through network communication channel 470 using a second network protocol. This may create additional capabilities for meeting QoS constraints by providing multiple networking options to the reader.

For example, the network used by the reader may depend on the final priority level. Reader 413 may need to transmit data received from RFID tags 404 and 405 to distant wireless LAN access point 420. Since the energy required for transmission is proportional to the square of the distance between the source and the destination, significant energy may be required from reader 413 to communicate directly with wireless LAN 420. To minimize energy usage while meeting QoS requirements, reader 413 may choose network paths according to the final priority level of the data. If the final priority level of tag 404 is low, reader 413 may transmit the data to nearby reader 412, which forwards the data to close by reader 411, which forwards the data to access point 420. If the final priority level of tag 405 is high, reader 413 may transmit the data directly to access point 420 in order to avoid introducing extra delays, albeit with the cost of expending more energy. While FIG. 4 illustrates two hops between readers 413 and access point 420, the number may range anywhere from one hop to several hops. Other advantages of multimode radio readers may include monitoring network conditions on a second network. Network conditions such as signal strength, latency, throughput, or delay may be monitored on the second network. By monitoring the second network, the reader may switch from the current network to the second network when it is advantageous to do so. These situations may arise due to a decreased load in the second network, decreased speed in the current network, change in the location of the reader, or problems in the current network such as weather or damaged cellular stations.

Figure 5:
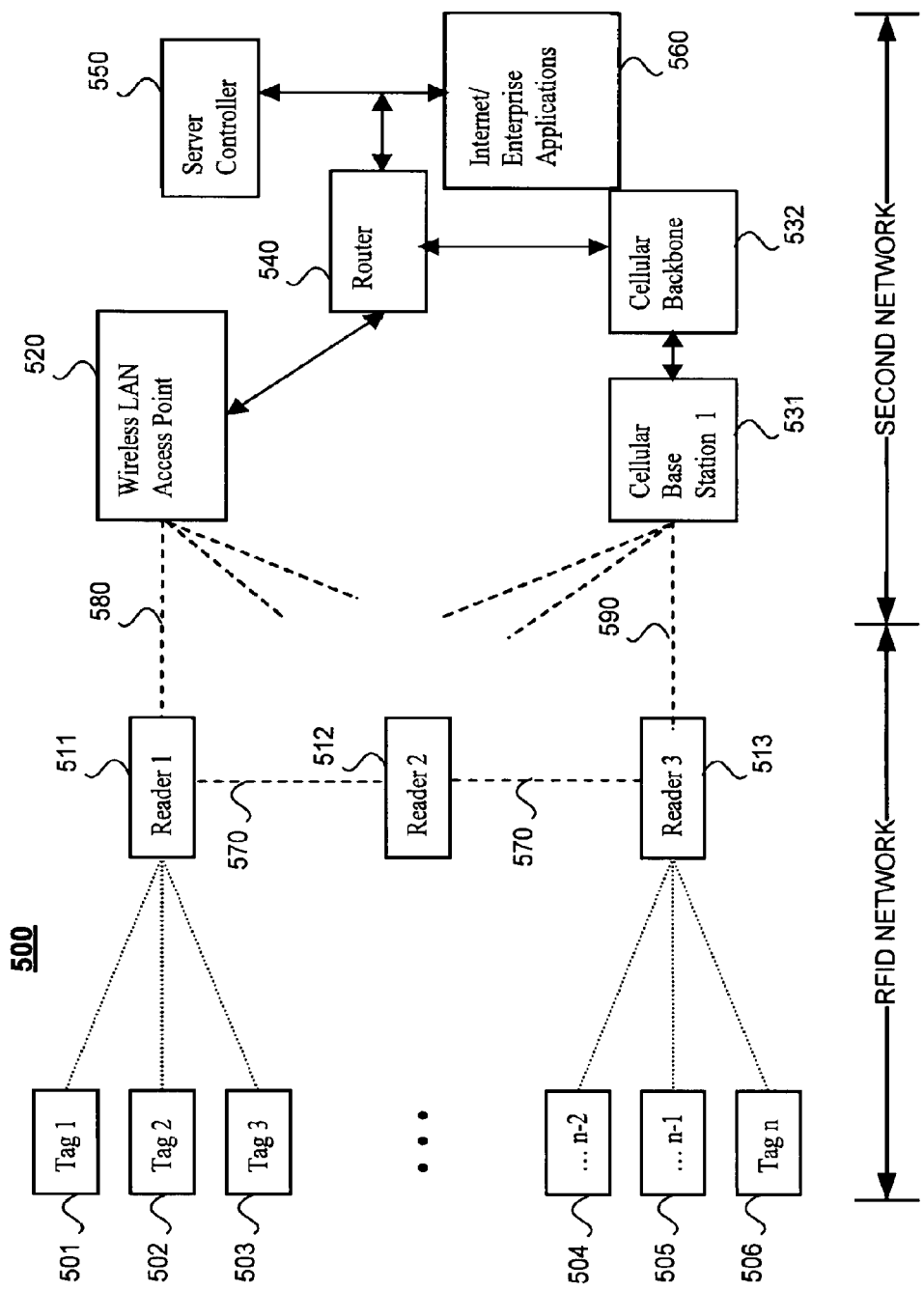
FIG. 5 illustrates a RFID system according to one embodiment of the present invention.

FIG. 5 illustrates a RFID system according to one embodiment of the present invention. System 500 includes a RFID network and a second network. The second network includes wireless LAN access point 520, cellular base station 531, cellular backbone 532, router 540, server controller 550, and internet/enterprise applications 560. The behavior and performance of these components coupled in the configuration illustrated in FIG. 5 has been discussed in detail above in FIG. 3. The RFID network comprises RFID tags 501 through 506 and RFID readers 511 through 513. In one embodiment, RFID readers 511 through 513 are multimode radio readers capable of transmitting data across various networks depending on their position, battery power, network usage cost, and/or network conditions. These readers may be embedded in a portable electronic device such as a PDA or a cell phone. In this example, readers 511 through 513 are capable of transmission by wireless LAN, cellular radios, and wireless ad-hoc/mesh. Reader 511 may connect to wireless LAN access point 520 through network communication channel 580 since it is positioned within the wireless network's range. Reader 512 may connect to reader 513 through ad-hoc network communication channel 570. An ad-hoc network is a self-configuring network comprising a plurality of mobile routers. The routers are free to move and organize themselves, thereby creating a network topology that may change rapidly and unpredictably. In this example, connecting reader 512 to the ad-hoc network 570 may save transmit energy when compared to a direct transmission to cellular base station 531 due to the shorter distance traveled. This may result in savings in battery power. Reader 3 may primarily connect to cellular base station 531 through network 590 because of network usage costs. These readers can also switch to another network if network conditions change. For example, if reader 511 in FIG. 5 is mobile and moves to a location where the wireless LAN signal is weak, it can switch to cellular base station 531 provided the cellular signal is stronger. This flexibility creates more robust networks capable of withstanding changing network conditions and disasters.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

APPENDIX 1.0 QOS for 802.11e WLAN 802.11e is an IEEE specification to define QoS mechanisms for wireless LAN equipment that gives support to bandwidth-sensitive applications such as voice and video. The following overview of 802.11e is quoted from the original 802.11 media access control protocol was designed with two modes of communication for wireless stations. The first, Distributed Coordination Function (DCF), is based on Carrier Sense Multiple Access with Collision Avoidance (CSMA/CA), sometimes referred to as "listen before talk." A station waits for a quiet period on the network and begins to transmit data and detect collisions. DCF provides coordination, but it doesn't support any type of priority access of the wireless medium.

An optional second mode, Point Coordination Function (PCF), supports time-sensitive traffic flows. Wireless access points periodically send beacon frames to communicate network identification and management parameters specific to the wireless network. Between the sending of beacon frames, PCF splits the time into a contention-free period and a contention period. With PCF enabled, a station can transmit data during contention-free polling periods.

Because DCF and PCF do not differentiate between traffic types or sources, the IEEE developed enhancements in 802.11e to both coordination modes to facilitate QoS. These changes would let critical service requirements be fulfilled while maintaining backward-compatibility with current 802.11 standards.

The enhancement to DCF—Enhanced Distribution Coordination Function (EDCF)—introduces the concept of traffic categories. Each station has eight traffic categories, or priority levels. Using EDCF, stations try to send data after detecting the medium is idle and after waiting a period of time defined by the corresponding traffic category called the Arbitration Interframe Space (AIFS). A higher-priority traffic category will have a shorter AIFS than a lower-priority traffic category. Thus stations with lower-priority traffic must wait longer than those with high-priority traffic before trying to access the medium.

To avoid collisions within a traffic category, the station counts down an additional random number of time slots, known as a contention window, before attempting to transmit data. If another station transmits before the countdown has ended, the station waits for the next idle period, after which it continues the countdown where it left off.

No guarantees of service are provided, but EDCF establishes a probabilistic priority mechanism to allocate bandwidth based on traffic categories.

Another way 802.11e aims to extend the polling mechanism of PCF is with the Hybrid Coordination Function (HCF). A hybrid controller polls stations during a contention-free period. The polling grants a station a specific start time and a maximum transmit duration.

2.0: QoS for 3GPP Cellular

The 3rd Generation Partnership Program (3GPP) has augmented the capabilities of General Packet Radio Service (GPRS) access to include QoS support. QoS mechanisms provided in the cellular network have to be robust and capable of providing reasonable QoS. There are four different 3GPP QoS classes; conversational, streaming, interactive, and background. These classes are designed to separate out traffic based on their sensitivity to delay. For example, the conversational class is meant for traffic which is very delay sensitive while the background class is the most delay insensitive traffic class.

Conversational and streaming classes are mainly intended to be used for real-time traffic flows. The conversational class is meant for the most time critical applications such as video telephony. Interactive and background classes are mainly meant to be used by traditional internet applications like www, email, telnet, ftp, and news. These classes provide looser delay but provide better error rate by means of channel coding and retransmission. The interactive class has higher scheduling priority than the background class and is mainly used by interactive applications (e-mail, web browsing), while the background class is meant for background traffic (email download, ftp). Background applications use transmission resources only when interactive applications do not need them. This is very important in wireless environment where the bandwidth is scarce compared to fixed networks.

3.0: QoS for Wired LAN Routers

The following discussion applies to fixed location RFID readers with an Ethernet connection to a router or high-end fixed location RFID readers that also perform router functionalities. Once the RFID information is mapped into network classes then traffic shaping policy, traffic control, and congestion control/avoidance can occur at the class level. Traffic shaping retains packets that are in excess of the maximum configured rate in a queue. Excess packets are then scheduled for later transmission over a period of time. This transforms traffic bursts into a smoothed packet output rate. An example of traffic control is to place broadcast packets into a best effort or CoS level 0 class and suppressing them when they exceed a preset percentage of total available bandwidth. This prevents broadcast traffic from disrupting priority queues with guaranteed bandwidth. Congestion avoidance techniques monitor network traffic and provide preferential treatment for priority class traffic under congestion situations. For example, Weighted Random Early Detection (WRED) is a congestion avoidance method that drops packets selectively based on IP precedence, where packets with a lower IP precedence are more likely to be dropped than packets with a higher precedence. For example, RFID packets that are in CoS/IP precedence level 5 (DSCP class Expedited Forwarding) would get preferential treatment over lower level packets.

After RFID data is mapped into a network traffic class the packets may be marked. The router can use standard marking mechanisms such those for Voice over IP (VoIP). With the anticipated large volume of RFID data in the future, RFID may also use a different marking mechanism that distinguishes RFID services and traffic classes from non-RFID traffic.

3.1: Packet Classification

In order to guarantee bandwidth for a class of packets a router, switch, or network node must be able to identify and group those packets from other packets. The step that matches a packet to a class of traffic is called packet classification. Some methods used for classification are the source and destination IP address in the IP header, port numbers in the IP or UDP header, protocols such as URLs and IP precedence.

3.2: Packet Marking

After a packet is classified it is marked so that other nodes in the network simply look at the marking to recognize the class of a packet and avoid repeating the processor intensive task of classification. Marking mechanisms that are similar include the six bits of the IP header for Differentiated Services Code Point (DSCP) (Layer 3) that enable differentiated service classes, the Type of Service (ToS) byte in the IP header (Layer 3) where the three most significant bits usually referred to as the IP precedence bits, and the three-bit 802.1p Class of Service (CoS) header field for prioritization (Layer 2) which works at the media access control (MAC) layer and allows packets to be grouped into various traffic classes. Other marking mechanisms include the ATM Cell Loss Probability (CLP) bit for prioritizing packets in ATM networks, and the 3 EXP bits in the label header of Multiprotocol Label Switching (MPLS) for supporting differentiated services.

Figure 6:
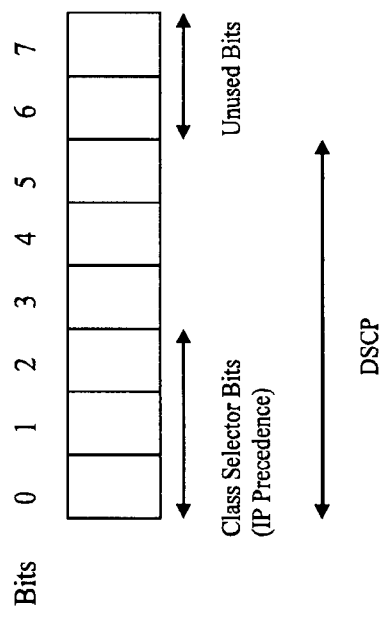
FIG. 6 illustrates differential services (DS).

FIG. 6 shows how Differentiated Service (DS) class definitions are defined in the IP header. The most significant 6 bits of the IP Type of Service (ToS) byte specify the DS class and are the DSCP bits. The most significant 3 bits are also the IP precedence bits in IPv4. The last two bits are not used in IPv4 but are used for flow control for DiffServe. The first 3 bits of DSCP are class selector bits that represent the different classes of service. IP precedence is compatible with DSCP because IP precedence also uses the 3 most significant bits to represent classes. This is illustrated in Table 3. IP precedence levels 0-5 also corresponds to CoS 0-5 respectively. Also shown in the table are IP Precedence/CoS values 6 (Internet) and 7 (Network). High priority and/or delay sensitive RFID packets should be marked with a CoS value of 5 for the Layer 2 802.1p settings and a DSCP class value of "Expediated Forwarding", or IP Precedence value of 5. On the other hand, RFID data that does not require priority treatment is more suitable for "Assured Forwarding" marking.

TABLE 3

Packet Priority Marking

| Layer 2 Class of Service (CoS) | IP Precedence | IP Precedence Bits | DSCP Bits | DSCP Values | DSCP Class |
|---|---|---|---|---|---|
| 7 | 7 | 111 | 111000 | 56-63 | Network |
| 6 | 6 | 110 | 110000 | 48-55 | Internet |
| 5 | 5 | 101 | 101000 | 40-47 | Expedited Forwarding |
| 4 | 4 | 100 | 100000 | 32-39 | Assured Forwarding 4 |
| 3 | 3 | 011 | 011000 | 24-31 | Assured Forwarding 3 |
| 2 | 2 | 010 | 010000 | 16-23 | Assured Forwarding 2 |
| 1 | 1 | 001 | 001000 | 8-15 | Assured Forwarding 1 |
| 0 | 0 | 000 | 000000 | 0-7 | Best Effort |

The next two bits after the first 3 bits of DSCP are used to define packet drop preferences (bits 3 and 4 in FIG. 6), and the last bit (bit 5 in FIG. 6) must be 0 to indicate that DS classes have been set. For each of the 4 Assured Forwarding classes there are three possible drop preferences, resulting in 12 possibilities, as outlined in Table 4. In times of congestion the first packets to be dropped by Level 2 are the high drop preference packets.

TABLE 4

Assured forwarding classes with possible drop preference levels

| Drop Preferences | Assured Forwarding 1 | Assured Forwarding 2 | Assured Forwarding 3 | Assured Forwarding 4 |
|---|---|---|---|---|
| Low Drop | 001010 | 010010 | 011010 | 100010 |
| Medium Drop | 001100 | 010100 | 011100 | 100100 |
| High Drop | 001110 | 010110 | 011110 | 100110 |

3.3: QoS Queuing

Once packets are classified queuing techniques can be used by routers to provide priority services and bandwidth guarantees. Packet loss and variable delay is increased when different types of data with different network requirements are placed in the same queue. Network behavior is more predictable when multiple queues are used. For example, high priority or delay sensitive RFID packets need to be placed in a priority queue with guaranteed bandwidth and be separated from other data packets. Queuing techniques include Low Latency Queuing, Priority Queuing, First In First Out (FIFO) queuing, Class-Based Weighted Fair Queuing, Enhanced Distributed Coordination Function, and Custom Queuing. For example, the LLQ queuing method provides a priority queue for certain traffic classes and guaranteed minimum bandwidth for other classes. It also has a default class for all traffic that is unclassified. LLQ allows the specification of queue depths to determine when a router should drop waiting packets on any class queue.

What is claimed is:

1. A method of providing quality of service for upstream data in a first RFID network comprising a set of tags and a set of readers, the first RFID network communicatively coupled to a second network, the method comprising:
    at a reader, receiving data from a plurality of tags;
    retrieving a reader priority level corresponding to the reader;
    for each tag:
        retrieving a tag priority level corresponding to the tag; and
        combining the retrieved reader priority level and the retrieved tag priority level to calculate a priority level for the received data from the tag; and
    sending, to the second network, the received data from the plurality of tags based on the calculated priority level for the received data from each tag.

2. The method of claim 1, wherein combining the retrieved reader priority level and the retrieved tag priority level comprises:
    selecting a function from a plurality of functions; and
    utilizing the selected function to combine the reader and tag priority levels.

3. The method of claim 2, wherein the function is one of maximum, minimum, average, median, and sum of the tag priority and the reader priority.

4. The method of claim 2, wherein the function selects the reader priority level as the priority level when combining the reader and the tag priority levels.

5. The method of claim 2, wherein the function selects the tag priority level as the priority level when combining the reader and the tag priority levels.

6. The method of claim 1, wherein combining the retrieved reader priority level and the retrieved tag priority level comprises applying a first weight to the tag priority level and a second different weight to the reader priority level.

7. The method of claim 1, wherein the tag and reader priority levels are combined through an RFID application software within the RFID reader, wherein the RFID application software selects one of a plurality of functions to combine the tag and reader priority levels.

8. The method of claim 1, wherein the reader priority level is based on an importance of data accessed by the reader, a time, or an application type that is supported by the reader.

9. The method of claim 1, wherein the reader priority level is based on a location of the reader.

10. The method of claim 9 further comprising:
    updating the location of the reader via GPS; and
    setting the reader priority level based on a set of pre-assigned location priorities.

11. A system of providing quality of service for upstream data, the system comprising:
    an RFID first network; and
    a second network communicatively coupled to the RFID first network;
    the RFID first network comprising:
        a set of tags; and
        a set of readers, each reader configured to:
            receive data from a plurality of tags;
            retrieve a reader priority level corresponding to the reader;
            retrieve, for each tag, a tag priority level corresponding to the tag;

combine, for each tag, the retrieved reader priority level and the retrieved tag priority level to calculate a priority level for the received data from the tag; and send, to the second network, the received data from the plurality of tags based on the calculated priority level for the received data from each tag.

12. The system of claim 11, wherein combining the retrieved reader priority level and the retrieved tag priority level comprises:

selecting a function from a plurality of functions; and utilizing the selected function to combine the reader and tag priority levels.

13. The system of claim 12, wherein the function is one of maximum, minimum, average, median, and sum of the tag priority and the reader priority.

14. The system of claim 12, wherein the function selects the reader priority level as the priority level when combining the reader and the tag priority levels.

15. The system of claim 12, wherein the function selects the tag priority level as the priority level when combining the reader and the tag priority levels.

16. The system of claim 11, wherein combining the retrieved reader priority level and the retrieved tag priority level comprises applying a first weight to the tag priority level and a second different weight to the reader priority level.

17. The system of claim 11, wherein each reader further comprises an RFID application stored within the reader, wherein the tag and reader priority levels are combined through an RFID application software, wherein the RFID application software selects one of a plurality of functions to combine the tag and reader priority levels.

18. The system of claim 11, wherein each reader priority level is based on an importance of data accessed by the reader, a time, or an application type that is supported by the reader.

19. The system of claim 11, wherein each reader priority level is based on a location of the reader.

20. The system of claim 19, wherein each reader is further configured to:

update the location of the reader via GPS; and set the reader priority level based on a set of pre-assigned location priorities.

* * * * *